Aug. 31, 1926.  
O. TOLLAGSEN  
1,598,222  
SELF BASTING COVER  
Filed Oct. 13, 1924
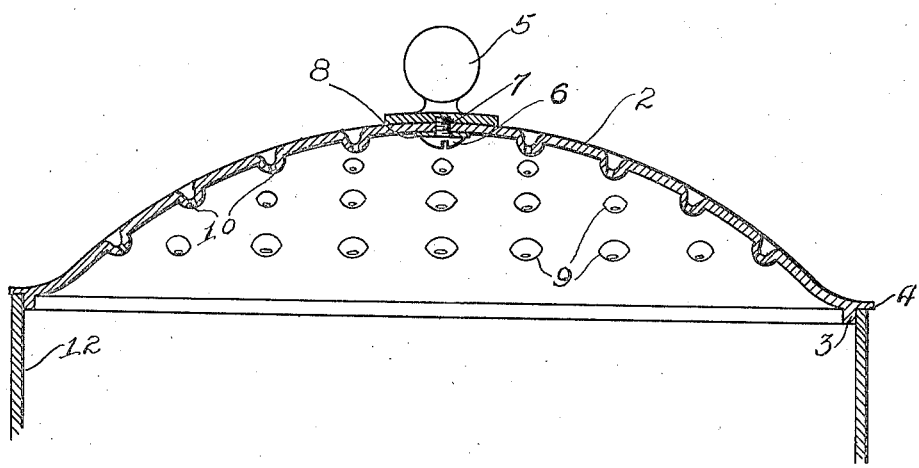
Inventor  
Olaf Tollagsen  
By Brown Boettcher & Dienner  
Attys.

Patented Aug. 31, 1926.

1,598,222

UNITED STATES PATENT OFFICE.

OLAF TOLLAGSEN, OF CHICAGO, ILLINOIS.

SELF-BASTING COVER.

Application filed October 13, 1924. Serial No. 743,186.

My invention relates to culinary utensils and more particularly to self-basting covers for roasting pans and the like.

The present invention is particularly useful in connection with roasters such as that disclosed in my co-pending application Serial No. 656,692, filed August 10, 1923, and allowed April 7, 1926.

Heretofore, in the roasting of meats and the like, difficulties have been experienced with the so-called self-basting cover due to the fact that during the process of roasting the steam and water vapors that condense on the cover have had no satisfactory egress. The result is that there is a complete return to the roast of all the distilled liquors and the article being cooked is steamed or boiled rather than roasted. Also in order to thoroughly brown the roast it has been found necessary to remove the cover to permit the steam to escape. Then too, the basting of the roast is frequently performed manually.

I propose to provide an improved and inexpensive cover that will promote the condensation of the vaporized juices of the roast; that will direct and distribute the juices evenly over the roast; that will allow steam to escape thereby producing a solution of highly concentrated grease which is so essential to a thorough browning of the roast; and that will be self-basting to such an extent that the attention of a person will not be required.

Now I am aware that there are certain perforated or ventilating covers on the market that have been designed to prevent the popping or spattering of grease or other contents of the kettle onto the stove or the hands of the attending cook. The openings in these covers, however, are controlled by the size of the depressions in the cover and in order to have a large depression in such covers it was necessary to have a correspondingly large opening, which feature I have found to be undesirable.

The cover I have devised has depressions with openings which are entirely independent of the size of the depressions. This is advantageous as it permits the use of relatively large depressions having relatively small apertures. Also by using relatively great depressions, a greater condensing surface is provided upon which the juices of the meat are adapted to condense.

Other objects and advantages of my invention will more fully appear from the following description when taken in connection with the accompanying drawing in which the single figure is a cross sectional view of a cover embodying the features of my invention.

Referring now to the drawing in detail, 2 denotes generally a cover, which may take an arcuate form, as shown, or any other conventional form, provided adjacent the edge with an annular depending flange or rib 3 having a shoulder 4 which is adapted to rest upon a roasting pan 12. The cover is provided with a handle 5 mounted approximately centrally of the cover and held in place by means of a screw 6 which passes through an aperture 7 in the cover and is threaded into the handle. A washer 8 is preferably placed between the head of the screw and the interior of the cover.

The cover 5 is provided with a plurality of teats or protuberances 9 which may be conveniently pressed therein and provide generally semi-spherical external pockets and generally semi-spherical internal teats distributed over the inner surface of the cover. Each teat or protuberance is independently perforated at 10. These perforations 10 are disposed substantially centrally of the associated protuberances and are adapted to permit steam to pass therethrough. Also, the apertures form air vents for the interior of the vessel and serve to prevent the boiling over of the contents within the vessel. These apertures 10 furthermore promote condensation of the vaporized juices of the meat or other food being roasted and assist the depending teats 9 in collecting and distributing the condensate uniformly over the roast.

It should be noted that since each opening 10 is disposed substantially centrally of the associated protuberance the size of the opening will be independent of the size of the protuberance. This construction is advantageous since it enables a relatively large protuberance to be used without increasing the size of the opening. Obviously, by providing relatively large teats or protuberances, a greater condensing surface is afforded the vapors within the vessel. Moreover, by providing relatively small openings only part of the vapors are allowed to escape. Then too, a part of these escaping vapors will condense in the depressions and gravitate back into the vessel thoroughly and uniformly basting the roast therein.

Now I desire it understood that although I have described in detail the preferred form of my invention, the invention is not to be limited thereby, but only in so far as defined by the scope and spirit of the appended claim.

I claim:—

As an article of manufacture, a cover for cooking utensils, means including a plurality of protuberances on the underside of the said cover for collecting condensate within the utensil, and means including a plurality of apertures in the said protuberances for permitting steam to pass therethrough, each of the said apertures being disposed substantially centrally of the associated protuberance, being independent of the size of the protuberance and also being of such a size as to permit the passage of steam, but prevent the passage of the more viscous fats.

In witness whereof, I hereunto subscribe my name this 9th day of October, 1924.

OLAF TOLLAGSEN.